United States Patent
Schwesig et al.

(10) Patent No.: US 9,355,600 B2
(45) Date of Patent: May 31, 2016

(54) DISPLAY DEVICE WITH READBACK DISPLAY

(71) Applicant: Siemens Aktiengesellschaft, München (DE)

(72) Inventors: Günter Schwesig, Erlangen (DE); Hanno Walders, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/851,416

(22) Filed: Mar. 27, 2013

(65) Prior Publication Data

US 2013/0257921 A1 Oct. 3, 2013

(30) Foreign Application Priority Data

Mar. 28, 2012 (EP) .................................... 12161839

(51) Int. Cl.
*G09G 3/36* (2006.01)
*G06F 3/042* (2006.01)
(Continued)

(52) U.S. Cl.
CPC ................ *G09G 3/36* (2013.01); *G06F 3/0412* (2013.01); *G06F 3/0421* (2013.01); *G06F 12/0607* (2013.01)

(58) Field of Classification Search
CPC ... G06F 3/0416; G06F 3/0421; G06F 3/0412; G06F 12/0607; G09G 3/36
USPC ............. 345/173, 174, 104; 178/18.05–18.06
See application file for complete search history.

(56) References Cited

U.S. PATENT DOCUMENTS

| 7,028,912 B1 * | 4/2006 | Rosen ........................... 236/1 C |
| 8,154,535 B2 * | 4/2012 | Tateuchi ............... G06F 3/0421 178/18.09 |
| 2005/0200293 A1 * | 9/2005 | Naugler et al. ............... 315/149 |

(Continued)

FOREIGN PATENT DOCUMENTS

| CN | 1945515 A | 4/2007 |
| DE | 102007038722 A1 | 2/2009 |
| WO | WO 2012006431 A2 | 1/2012 |

OTHER PUBLICATIONS

Chinese Search Report issued by the Chinese Patent Office in counterpart Chinese Patent Application No. 2013100977981 on Aug. 25, 2015.

(Continued)

*Primary Examiner* — Lun-Yi Lao
*Assistant Examiner* — Kelly B Hegarty
(74) *Attorney, Agent, or Firm* — Henry M. Feiereisen LLC

(57) ABSTRACT

A display device includes a plurality of cells arranged in a two-dimensional matrix and including luminous elements and feedback elements arranged in the cells. A control device emits control signals to control the luminous elements individually in accordance with a setpoint control pattern. An evaluation device receives from the feedback elements feedback signals depending on actual control states of the luminous elements and determines a feedback pattern based on the feedback signals. The evaluation device then compares the feedback pattern with the setpoint control pattern and producing a normal reaction when the feedback pattern matches the setpoint control pattern, and producing a fault reaction that is different from the normal reaction when the feedback pattern fails to match the setpoint control pattern.

11 Claims, 3 Drawing Sheets

(51) Int. Cl.
*G06F 3/041* (2006.01)
*G06F 12/06* (2006.01)

(56) References Cited

U.S. PATENT DOCUMENTS

| | | | | |
|---|---|---|---|---|
| 2006/0017688 A1* | 1/2006 | Hohmann et al. | | 345/102 |
| 2006/0244693 A1* | 11/2006 | Yamaguchi et al. | | 345/76 |
| 2008/0122792 A1* | 5/2008 | Izadi | G06F 3/0421 | 345/173 |
| 2008/0205701 A1* | 8/2008 | Shamaie | G06F 3/017 | 382/103 |
| 2008/0278453 A1* | 11/2008 | Reynolds | G01D 3/08 | 345/173 |
| 2009/0058824 A1* | 3/2009 | Nissar | G06F 3/0421 | 345/173 |
| 2009/0211820 A1* | 8/2009 | Lin et al. | | 178/18.09 |
| 2009/0225058 A1 | 9/2009 | Tateuchi | | |
| 2010/0271321 A1* | 10/2010 | Senda et al. | | 345/173 |
| 2011/0050620 A1* | 3/2011 | Hristov | G06F 3/0416 | 345/174 |
| 2011/0202146 A1* | 8/2011 | Heil et al. | | 700/12 |
| 2013/0127721 A1* | 5/2013 | Gu | G06F 3/033 | 345/166 |

OTHER PUBLICATIONS

English translation of Chinese Search Report issued by the Chinese Patent Office in counterpart Chinese Patent Application No. 2013100977981 on Aug. 25, 2015.

* cited by examiner

DISPLAY DEVICE WITH READBACK DISPLAY

CROSS-REFERENCES TO RELATED APPLICATIONS

This application claims the priority of European Patent Application, Serial No. EP 12161839.1, filed Mar. 28, 2012, pursuant to 35 U.S.C. 119(a)-(d), the content of which is incorporated herein by reference in its entirety as if fully set forth herein.

BACKGROUND OF THE INVENTION

The present invention relates to a display device with a plurality of cells having luminous elements arranged in a two-dimensional matrix and to a method for controlling such display device.

The following discussion of related art is provided to assist the reader in understanding the advantages of the invention, and is not to be construed as an admission that this related art is prior art to this invention.

Display devices of this kind are generally known—for example in the form of TFT displays. Further, TFT displays having light sensors arranged in the cells in addition to the luminous elements are also known. These light sensors detect light falling on the TFT display from a viewing direction. This can be evaluated by touch recognition, so the corresponding TFT display can be used as a touchscreen.

It would be desirable and advantageous to obviate prior art shortcomings and to provide an improved display device wherein the image that is actually output by the display device can be checked for correctness in a simple and reliable manner.

SUMMARY OF THE INVENTION

According to one aspect of the present invention, a display device includes a plurality of cells arranged in a two-dimensional matrix, wherein the cells include luminous elements and feedback elements arranged in the cells, a control device emitting control signals to control the luminous elements individually in accordance with a setpoint control pattern, and an evaluation device. The feedback elements transmit to the evaluation device feedback signals depending on actual control states of the luminous elements. The evaluation device determines a feedback pattern based on the feedback signals, and compares the feedback pattern with the setpoint control pattern. When the feedback pattern matches the setpoint control pattern, the evaluation device produces a normal reaction, whereas when the feedback pattern fails to match the setpoint control pattern, the evaluation device produces a fault reaction that is different from the normal reaction.

Advantageously, the two-dimensional matrix may be covered with a front cover, as seen from a direction of touch of the display device.

When the feedback elements are constructed as light sensors, the front cover may be partly reflective or scattering, and light signals emitted by the luminous elements may be partly reflected or scattered into the light sensors by the front cover.

According to an advantageous feature of the present invention, the display device may have at least two sensor devices, with the sensor devices detecting independently of one another whether, and optionally at which position, the two-dimensional matrix or a front cover that covers the two-dimensional matrix is being touched. This allows the display device to be upgraded into a fully functional fail-safe output and input device. One of the sensor devices may include the light sensors.

Advantageously, the front cover may be constructed as a resiliently deformable front cover. In this case, at least one of the sensor devices may the initially responds to a deformation of the front cover rather than merely to a touch of the front cover. This increases the reliability of the display device and prevents false control.

According to another advantageous feature of the present invention, at least the one of the sensor devices which responds to a resilient deformation of the front cover, but not already to a touch of the front cover, may continue to respond to the deformation while the deformation is maintained. Thus, not only is the deformation of the front cover detected, but also the duration thereof.

The display device having the inventive construction may advantageously be used as an output device of a human-machine interface of a fail-safe industrial controller.

Alternatively or in addition, the feedback elements may not only be constructed as light sensors with reflection or scattering at a front cover, but the control signals in the two-dimensional matrix may be coupled directly to the feedback elements.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
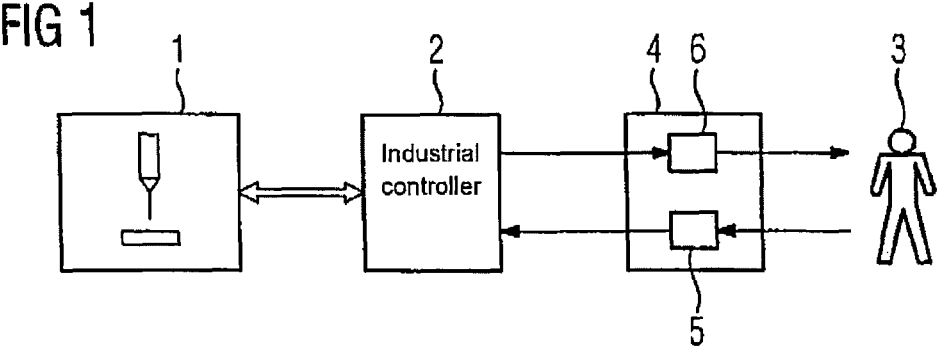
FIG. 1 shows a block diagram of an industrial technical system.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an industrial technical device 1—illustrated in FIG. 1 by way of example as a boring machine—is controlled by an industrial controller 2. The industrial controller 2 is constructed as a fail-safe controller, i.e. an individual fault cannot cause the controlled device 1 to be placed in an unsafe condition in which it can harm an operator 3 and/or can damage the device itself or another device. Fail-safe controllers are generally known in the art. For example, reference is made in the field of programmable logic controllers to the Applicant's SIMATIC S7-300F.

The industrial controller 2 has a human-machine interface 4. The human-machine interface 4 has a (secure) input device 5 as well as an output device 6. The industrial controller 2 receives input from the operator 3 via the input device 5. The industrial controller 2 outputs information to the operator 3 via the output device 6.

Figure 2:
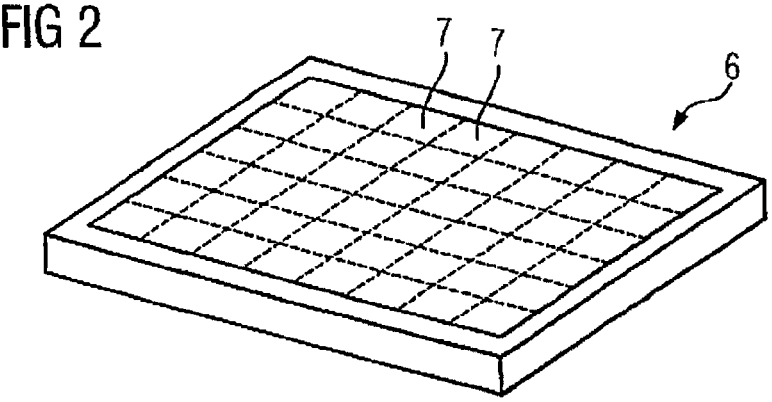
FIG. 2 shows a perspective illustration of a display device.
Figure 3:
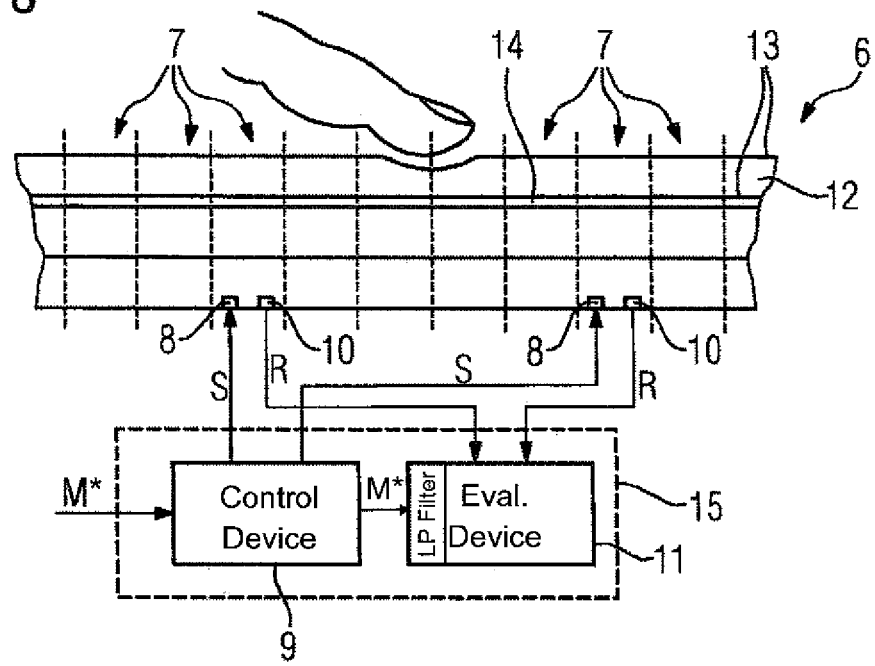
FIG. 3 shows a functional diagram of the display device according to the present invention.

According to FIG. 2, the output device 6 is constructed as a display device 6. The display device 6 has a plurality of cells 7. The cells 7 are arranged in a two-dimensional matrix. The number of cells 7 is frequently quite large. For example, 100×100 cells 7 or more may be present. Arranged in the cells 7, according to FIG. 3, are luminous elements 8. The luminous elements 8 are controlled individually by control signals S from a control device 9 of the display device 6 in accordance with a setpoint control pattern M*. Assuming that the display device 6 functions properly, the luminous elements 8 output corresponding light signals to the operator 3 of the device commensurate with the control signals S.

Figure 4:
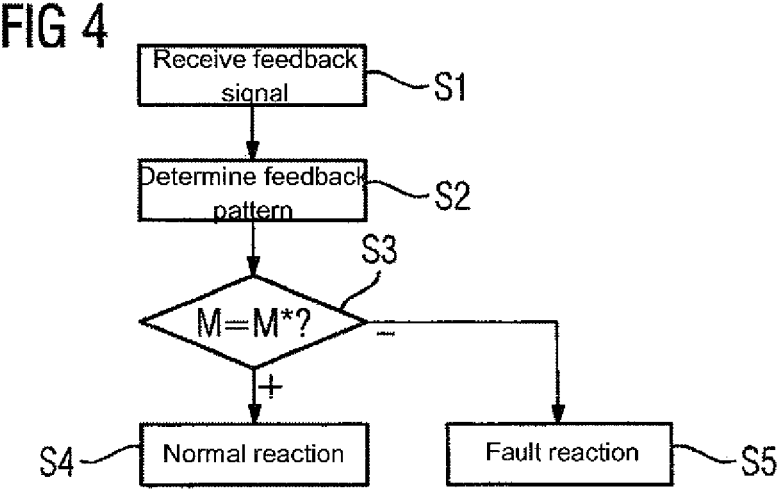
FIG. 4 shows a flow chart of the method according to the present invention.

Furthermore, feedback elements 10 are arranged in the cells 7. Feedback signals R are transmitted from the feedback elements 10 to an evaluation device 11 of the display device 6. The evaluation device 11 receives the feedback signals R in a step S1, as shown in FIG. 4.

The feedback signals R depend on the actual control states of the luminous elements 8. For example, the control signals S in the two-dimensional matrix may be coupled directly to the feedback elements 10 (cross talk). Therefore, for example, an electrical current applied to a particular luminous element 8 may produce a current or a voltage in one or more of the adjacent feedback elements 10, wherein the produced current or the produced voltage or a variable derived therefrom corresponds to the feedback signal R.

The two-dimensional matrix is typically covered by a front cover 12, as seen from a direction of touch of the display device 6, regardless of whether or not the control signals S are coupled directly to the feedback elements 10. The front cover 12 may, in a manner corresponding to the illustration in FIG. 3, be constructed as a resiliently deformable front cover 12. Regardless of whether or not the front cover 6 is deformable, the front cover 12 has two boundary surfaces 13. One of the boundary surfaces 13 is associated with the two-dimensional matrix and the other with the operator 3.

When the boundary surfaces 13 are smooth, a portion of the light radiating from the luminous elements 8—i.e. the light signals emitted by the luminous elements 8—is reflected at the two boundary surfaces 13. In this case, the front cover 12 is partially reflective. Alternatively, the two boundary surfaces 13 may be slightly roughened, so that the front cover 12 scatters light. Regardless of whether the front cover 12 is reflective or scattering, a portion of the light emitted by the luminous elements 8 is returned from the front cover 12 to the two-dimensional matrix where it is incident on the feedback elements 10. The only difference is that the light is (partly) reflected in one situation and scattered in the other situation.

Because a portion of the light emitted by the luminous elements 8 is directed through the front cover 12 onto the feedback elements 10, the feedback elements 10 may be constructed as light sensors, for example photodiodes.

When the boundary surfaces 13 have smooth boundary surfaces 13, a corresponding reflection is produced inherently due to the differences in the refractive index. However, a special partially reflective layer 14 may be arranged on one of the boundary surfaces 13—optionally on both boundary surfaces 13—in order to deliberately enhance the effect of the reflection.

The evaluation device 11 may be a device different from the control device 9. Alternatively, the two devices 9, 11 may be combined into a common monitoring device 15, as indicated in FIG. 3 by a dashed border. However, the evaluation device 11 determines in either case a feedback pattern M in step S2 shown in FIG. 4, based on the feedback signals R. Furthermore, in a step S3, the evaluation device 11 compares the feedback pattern M with the setpoint control pattern M*.

If the feedback pattern M matches the setpoint control pattern M*, the evaluation device 11 goes to step S4 shown in FIG. 4. In step S4, the evaluation device 11 exhibits a normal reaction. For example, the evaluation device 11 may transmit an OK message to the fail-safe industrial controller 2. Conversely, when the feedback pattern M does not match the setpoint control pattern M*, the evaluation device 11 goes to step S5. In step S5, the evaluation device 11 produces a fault reaction. The fault reaction is different from the normal reaction. For example, in the event of the fault reaction, the normal reaction may simply not be carried out. Alternatively or in addition, a separate reaction may be produced, for example an error message may be outputted.

Within the context of step S3, the feedback pattern M in its present form may be compared with the setpoint control pattern M* in its present form. Preferably, however, the evaluation device 11 locally low-pass filters the two patterns M, M* before the comparison and compares the low-pass-filtered patterns with one another.

The display device 6 according to the invention may be operated exclusively as a display device. An example of an application of such display devices 6 are relatively large display boards installed in public buildings, such as airports or train stations, for displaying safety-related information or other information. Preferably, however, the display device 6 according to the invention additionally includes a secure input functionality. In this case, the display device 6 according to FIGS. 5 and 6 has at least two sensor devices 16. The sensor devices 16 are used to determine—independently of one another—how and optionally at which position (sometimes even at which positions) the front cover 12 is being touched. When the front cover 12 is not present—which is possible in special cases—touching of the two-dimensional matrix is directly recognized with the sensor devices 16.

Figure 5:
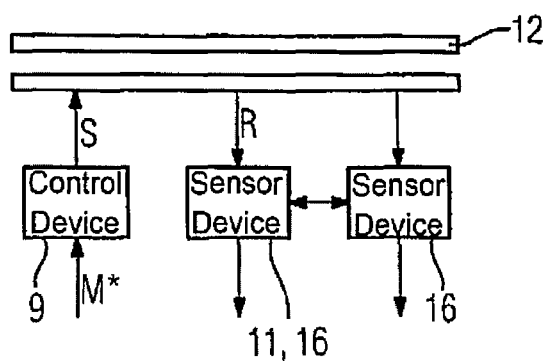
FIGS. 5 and 6 show functional diagrams of modified display devices.
Figure 6:
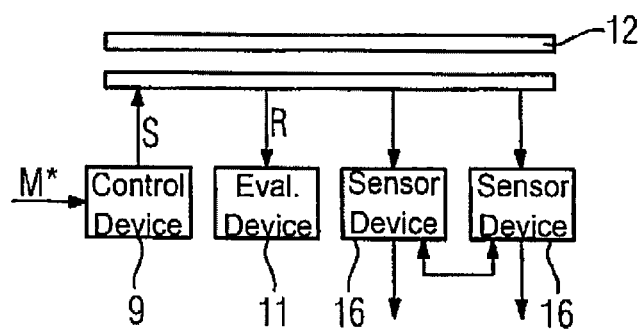

When the feedback elements 10 are constructed as light sensors, one of the sensor devices 16 may also include the light sensors 10, as shown in the diagram of FIG. 5. Alternatively, as shown in the diagram of FIG. 6, both sensor devices 16 may be independent of the feedback elements 10.

Figure 7:
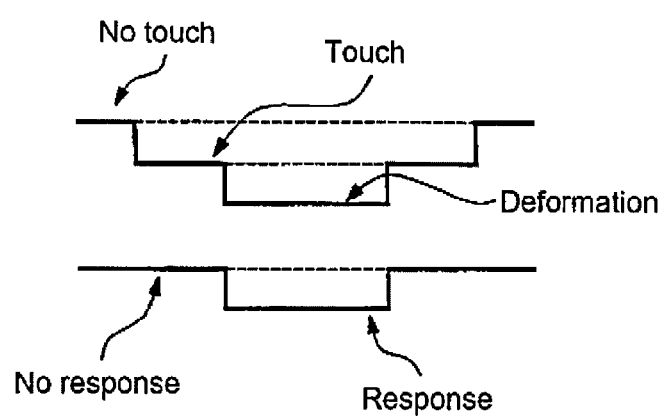
FIG. 7 shows a timing diagram.

When the front cover 12 is deformable, then according to the diagram of FIG. 7, preferably at least one of the sensor devices 16—preferably both sensor devices 16—does not already respond to a touch of the front cover 12, but only to deformation of the front cover 12. Furthermore, according to the diagram of FIG. 7, the corresponding sensor device 16 preferably continues to respond to the deformation while the deformation is maintained. Thus, not only the time at which the device is touched is detected, but also the duration of the touch.

When the sensor device 16 (or the sensor devices 16) responds to a deformation of the front cover 12, the corresponding state may be recognized for example from changes in the reflective or scattering effect. The deformation may also affect other optical properties of the front cover 12.

The present invention has many advantages and enables a secure display to be implemented in a simple manner.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A display device, comprising:
   a plurality of cells arranged in a two-dimensional matrix, wherein each cell comprises a luminous element and a feedback element comprising a light sensor arranged in the cell,
   a control device emitting control signals to control the luminous elements in each of the plurality of cells individually in accordance with a setpoint control pattern, and
   an evaluation device receiving from the feedback elements in each of the plurality of cells feedback signals depending on actual control states of the luminous elements in the associated cell and determining a feedback pattern of the display device based on the feedback signals, the evaluation device further receiving from the control device the setpoint control pattern and spatially low-pass filtering the feedback pattern and the setpoint control pattern and thereafter comparing the low-pass-filtered feedback pattern with the low-pass-filtered setpoint control pattern and transmitting an OK message to a fail-safe industrial controller when the low-pass-filtered feedback pattern is in agreement with the low-pass-filtered setpoint control pattern, and transmitting an error message to the fail-safe industrial controller that is different from the OK message when the low-pass-filtered feedback pattern is in disagreement with the low-pass-filtered setpoint control pattern.

2. The display device of claim 1, further comprising a front cover covering the two-dimensional matrix, as viewed from a touch direction of the display device.

3. The display device of claim 2, wherein the feedback elements comprise light sensors, wherein the front cover partially reflects or scatters light, and wherein light signals emitted by the luminous elements are partially reflected or scattered into the light sensors by the front cover.

4. The display device of claim 1, further comprising an additional sensor element configured to detect in conjunction with or independently of the feedback element whether the two-dimensional matrix is being touched.

5. The display device of claim 4, wherein the additional sensor element or the feedback element, or both, detect a location where the two-dimensional matrix is being touched.

6. The display device of claim 4, wherein the additional sensor element or the feedback element, or both, detect whether a front cover covering the two-dimensional matrix is being touched.

7. The display device of claim 6, wherein the additional sensor element or the feedback element, or both, detect a location where the front cover is being touched.

8. The display device of claim 1, wherein the display device is used as an output device of a human-machine interface of a fail-safe industrial controller.

9. The display device of claim 1, wherein the control signals are coupled directly to the feedback elements in the two-dimensional matrix.

10. A display device, comprising:
    a plurality of cells arranged in a two-dimensional matrix,
    a deformable front cover covering the two-dimensional matrix,
    wherein each cell comprises a luminous element and a feedback element comprising a light sensor arranged in the cell, wherein light signals emitted by the luminous element of the cell is partially reflected or scattered into the light sensor of the cell by the front cover,
    an additional sensor element configured to detect independently of the feedback element whether the deformable front cover is being deformed,
    a control device emitting control signals to control the luminous elements individually in accordance with a setpoint control pattern, and
    an evaluation device receiving from the feedback elements feedback signals depending on actual control states of the luminous elements and determining a feedback pattern of the display device based on the feedback signals, the evaluation device further receiving from the control device the setpoint control pattern and configured to spatially low-pass filter the feedback pattern and the setpoint control pattern and to compare the lowpass-filtered feedback pattern with the low-pass-filtered setpoint control pattern and to transmit an OK message to a fail-safe industrial controller when the low-pass-filtered feedback pattern is in agreement with the lowpass-filtered setpoint control pattern, and to transmit an error message to the fail-safe industrial controller that is different from the OK message when the low-pass-filtered feedback pattern is in disagreement with the low-pass-filtered setpoint control pattern,
    wherein at least one of the light sensor or the additional sensor element responds to a deformation of the deformable front cover and the evaluation device is further configured to detect the deformation of the front cover in response to light emitted by the luminous element of a cell and reflected or scattered from the deformed front cover and received by the at least one light sensor or the additional sensor element of the cell.

11. The display device of claim 10, wherein the light sensor or the additional sensor element responds to the deformation for as long as the deformation is maintained.

* * * * *